United States Patent [19]
Yabuuchi et al.

[11] Patent Number: 6,034,702
[45] Date of Patent: Mar. 7, 2000

[54] CHARACTER FORMING APPARATUS

[75] Inventors: Yuka Yabuuchi, Yamatokoriyama; Susumu Hasegawa, Sakai, both of Japan

[73] Assignee: Sharp Kabushiki Kaisha, Osaka, Japan

[21] Appl. No.: 08/840,404

[22] Filed: Apr. 29, 1997

[30] Foreign Application Priority Data

May 13, 1996 [JP] Japan ................................. 8-118068

[51] Int. Cl.[7] ........................................ G09G 5/22
[52] U.S. Cl. ............................ 345/471; 345/142
[58] Field of Search ........................ 345/471, 142

[56] References Cited

U.S. PATENT DOCUMENTS

| | | | |
|---|---|---|---|
| 5,481,277 | 1/1996 | Morinaga | 345/143 |
| 5,727,140 | 3/1998 | Ohtomo et al. | 395/167 |
| 5,771,035 | 6/1998 | Imaki et al. | 345/143 |

FOREIGN PATENT DOCUMENTS 06149216  5/1994  Japan .

OTHER PUBLICATIONS

O. Yuji, "Pattern Deformation System", Japanese Laid–Open Patent Publication No. 3–234559, Laid Open on Oct. 18, 1991.

F. Mitsuko, "End Point Shape Changing System for Character Forming Device", Japanese Laid–Open Patent Publication No. 4–56894, Laid Open on Feb. 24, 1992.

*Primary Examiner*—Mark K. Zimmerman
*Assistant Examiner*—Mano Padmanabhan
*Attorney, Agent, or Firm*—David G. Conlin; Richard E. Gamache

[57] ABSTRACT

When a character of a basic font to be used for character formation and a font to be applied to the character are designated through a key board, an element shape recognizing unit and a regular shape recognizing unit select component piece data to be used, among those stored in an element portion pasting-use component piece data storing unit and a regular shape portion pasting-use component piece data storing unit, in accordance with the information thus supplied. The element shape recognizing unit and the regular shape recognizing unit detect target portions to which component pieces are to be pasted, among the portions of the character of the basic font which was designated through the key board. The character data synthesizing unit pastes the component pieces thus selected to the target portions thus detected by the element shape recognizing unit and the regular shape recognizing unit so as to synthesize the character data.

14 Claims, 23 Drawing Sheets

FIG. 4

(CHARACTER DATA)

| FONT CODE | THIN GOTHIC 7000 | -- FONT NAME<br>-- NUMBER OF CHARACTERS |
|---|---|---|
| CHARACTER CODE | 3026<br>12 | -- CHARACTER NUMBER (JIS CODE)<br>-- NUMBER OF POLYGONS<br>  CONSTITUTING THE CHARACTER |
| INFORMATION ON<br>THE NUMBER OF STROKES | 13 | -- NUMBER OF STROKES |
| POLYGON INFORMATION | 1<br>12 | -- POLYGON NUMBER<br>-- NUMBER OF POINTS<br>  CONSTITUTING THE POLYGON |
| PASTING REFERENCE<br>INFORMATION | 7<br>8<br>30 | -- REFERENCE STARTING POINT NUMBER<br>-- REFERENCE END POINT NUMBER<br>-- REFERENCE ANGLE |
| POINT INFORMATION | 1<br>450<br>400<br>●○○● | -- POINT NUMBER<br>-- X-COORDINATE<br>-- Y-COORDINATE<br>-- POINT ATTRIBUTE INFORMATION (FLAG)<br>  (ELEMENT END FLAG IN ON STATE) |
| POINT NUMBER INFORMATION | 5<br>450<br>230 | -- ELEMENT NUMBER<br>-- PASTING REFERENCE<br>  INFORMATION X-COORDINATE<br>-- PASTING REFERENCE<br>  INFORMATION Y-COORDINATE |
| POINT INFORMATION | 2<br>900<br>20<br>○○○● | |
| POLYGON INFORMATION | 5<br>21 | |

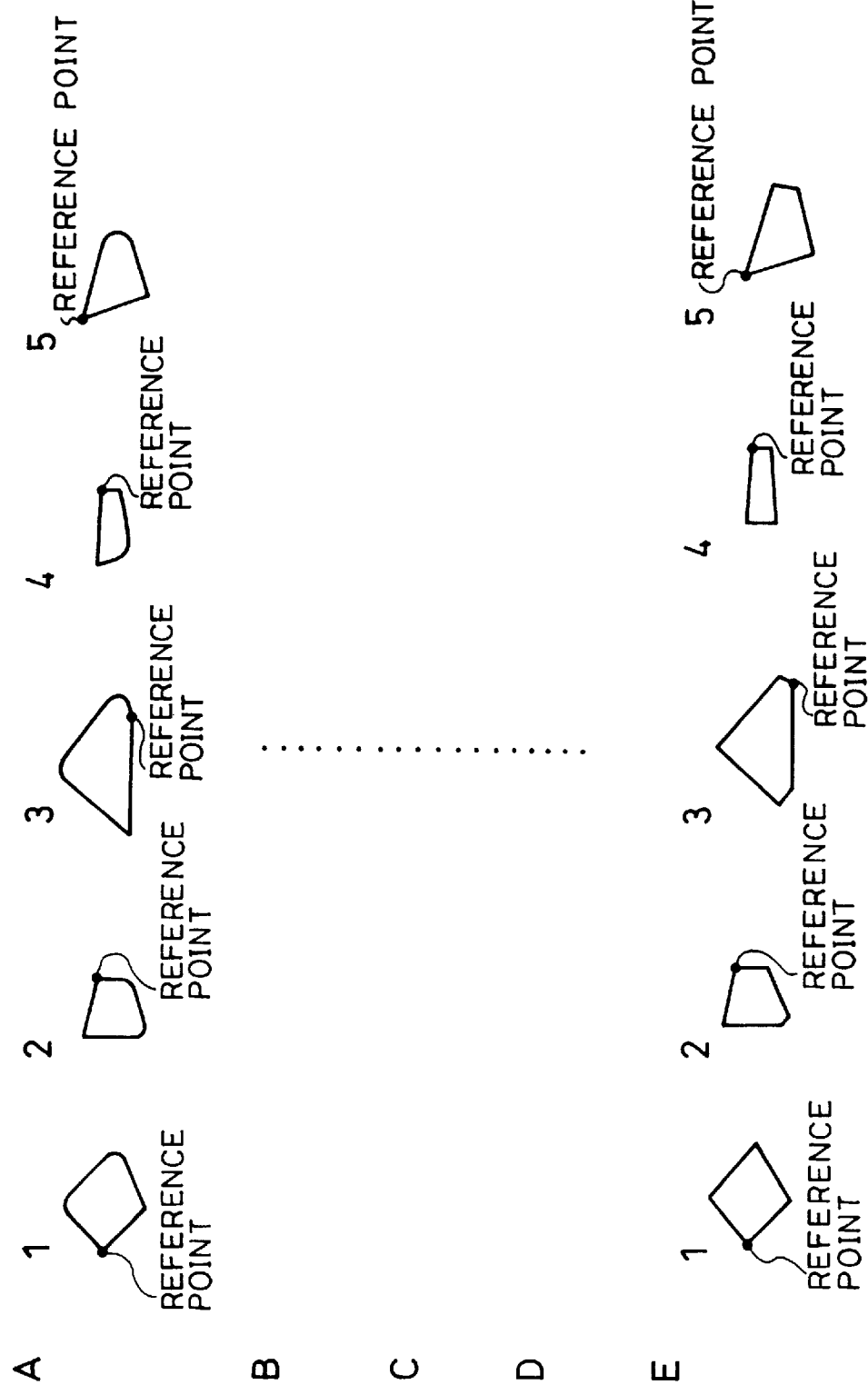

F I G. 1 0

(REFERENCE TABLE)

| NUMBER OF STROKES | STROKE NUMBER RANK CODE | PASTING-LISE COMPONENT PIECE TYPE |
|---|---|---|
| 1 ~ 9 | A | 1, 2, 3, 4, 5, ---------------- |
| 10 ~ 14 | B | 1, 2, 3, 4, 5, ---------------- |
| 15 ~ 19 | C | 1, 2, 3, 4, 5, ---------------- |
| 20 ~ 24 | D | 1, 2, 3, 4, 5, ---------------- |
| 25 ~ | E | 1, 2, 3, 4, 5, ---------------- |

F I G. 1 1

| ELEMENT NUMBER | PASTING-LISE COMPONENT PIECE TYPE |
|---|---|
| 2 0 0 0 | 2 |
| 2 0 0 1 | 1 |
| 2 0 0 2 | 3 |
| 2 1 0 0 | 8 |
| 2 1 0 1 | 9 |
| 2 1 0 2 | 4 |
| 2 2 0 0 | 5 |
| 2 2 0 1 | 1 |
| ⋮ | ⋮ |

CHARACTER FORMING APPARATUS

FIELD OF THE INVENTION

The present invention relates to a character forming apparatus. More specifically, the present invention relates to a character forming apparatus capable of diversifying outlines by pasting outline font data so that multiple lettering can be easily achieved.

BACKGROUND OF THE INVENTION

To obtain digitalized outline fonts, conventional character forming apparatuses read a great number of outlines of original letters such as characters and symbols designed by designers, by using electronic scanners. Therefore, to create a new font by the use of such conventional apparatuses, enormous amount of labor and time as well as massive data are required.

Therefore, to solve the problem of the time and labor spent for development of the new fonts, and the problem of the amount of the data, various methods whereby a plurality of fonts can be created from a piece of data have been proposed.

For example, the Japanese Publications for Laid-Open Patent Applications No. 3-234559/1991 (Tokukaihei No. 3-234559) and No. 4-56894/1992 (Tokukaihei NO. 456894) disclose a method for creating different fonts, by applying a single predetermined deformation process to a part of outline font data so as to change outline forms of characters.

To be more specific, the former publication discloses a technology whereby new drafting points or control points are created by calculation in outline character data composed of straight lines and Bezier lines so that outline character is deformed. On the other hand, the latter publication discloses a technology whereby element portions of the outline character data are once deleted and the element portions are restored in accordance with different data.

Here, the following description will explain the above-mentioned "elements". As to a character shown in FIG. 24(a), elements 51a represent end portions (portions indicated by thick lines) of strokes 51b, while the strokes 51b are picture lines constituting an image of the character.

However, although it is possible to change the end portions, that is, the element portions, by either of the technologies disclosed by the foregoing documents, it is impossible to change portions other than the elements. Therefore, only one deformed pattern of the font can be obtained. Besides, a problem of deterioration of visibility is caused; for example, in the case of a complicated character having many strokes, ornamental parts such as stops of strokes, and shoulders, i.e., turning points of strokes, are smeared.

SUMMARY OF THE INVENTION

The object of the present invention is to provide a character forming apparatus which is capable of forming characters of various fonts with ease, at a high speed, and with a small quantity of data.

To achieve the above object, a character forming apparatus of the present invention includes (1) character data storing unit for storing character data showing each shape of characters of a basic font for the use in character formation, each character having target portions to which component pieces are to be pasted, (2) a component piece data storing unit for storing data on a plurality of component pieces to be pasted to the target portions of the character of the basic font, (3) input means for designating a character of the basic font and another font to be used for processing the character, (4) a shape recognizing unit for detecting the target portions of the character data of the basic font designated by the input means, (5) component piece data selecting means for selecting component piece data to be used among those stored by the component piece data storing unit, based on information supplied from the input means, and (6) a character data synthesizing unit for synthesizing the character data so that the component pieces selected by the component piece data selecting means are pasted to the target portions detected by the shape recognizing unit.

With the aforementioned arrangement, once the character of the basic font and the font to be used for processing the character are designated by the input means, the component piece data selecting means selects component piece data to be used in accordance with the information, among those stored in the component piece data storing unit. The shape recognizing unit detects the target portions of the character data of the basic font designated by the input means. The character data synthesizing unit synthesizes the character data so that the component pieces selected by the component piece data selecting means are pasted to the target portions detected by the shape recognizing unit. By doing so, a desired character can be formed.

As described above, since with the character forming apparatus of the present invention the desired character is formed by synthesizing the component piece data stored in the component piece data storing unit and the character data on the character of the basic font, it is possible to change shapes of not only the element portions but also the other portions of the polygons constituting the character. Besides, characters in various fonts can be formed based on data, or font data, on one character. Therefore, characters of various fonts can be easily formed at a higher speed with less quantity of data.

For a fuller understanding of the nature and advantages of the invention, reference should be made to the ensuing detailed description taken in conjunction with the accompanying drawings.

BRIEF DESCRIPTION OF THE DRAWINGS

FIG. 4 is an explanatory view illustrating constitution of the character data stored in the character data storing unit illustrated in FIG. 1.

FIG. 5 is an explanatory view illustrating examples of pasting-use component pieces whose data are stored in the element portion-use component piece data storing unit and the regular shape portion-use component piece data storing unit illustrated in FIG. 2.

FIG. 10 is an example of a reference table showing correspondence between the number of strokes and the component piece, the reference table being stored in the table storing unit shown in FIG. 1.

FIG. 11 is an explanatory view illustrating correspondence between the element number and the type of the pasting-use component pieces which are used by the character forming apparatus illustrated in FIG. 1.

DESCRIPTION OF THE PREFERRED EMBODIMENTS

The following description will depict an embodiment of the present invention, while referring to FIGS. 1 through 23.

Figure 1:
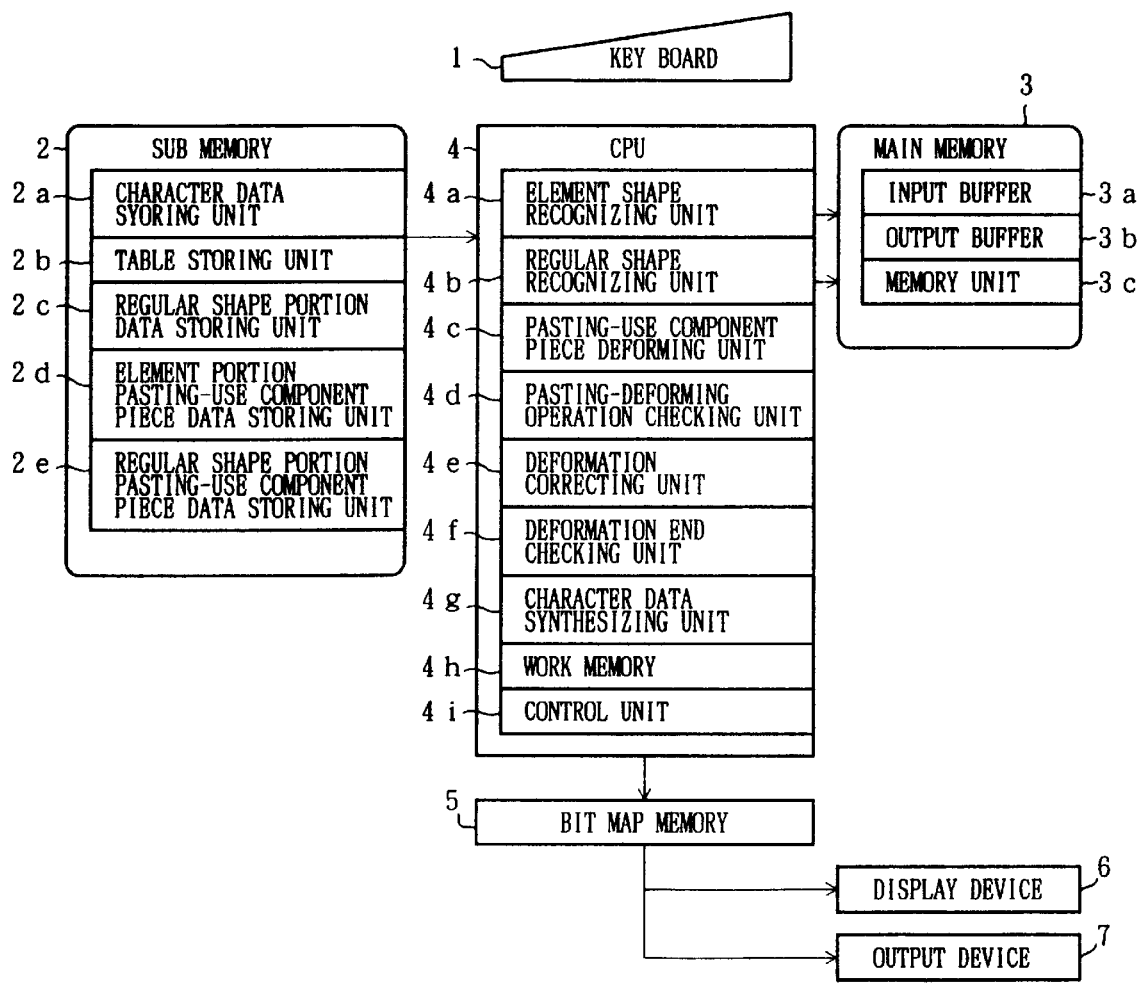
FIG. 1 is a block diagram illustrating an arrangement of a character forming apparatus of one embodiment of the present invention.

A character forming apparatus has a key board 1 as input means, a sub memory 2, a main memory 3, a CPU 4, a bit map memory 5, a display device 6, and an output device 7, as illustrated in FIG. 1.

The key board 1 is for inputting to the CPU 4 character codes and font codes of a character to be formed.

The sub memory 2 incorporates (1) a character data storing unit 2a as character data storing means, (2) a table storing unit 2b as storing means for storing data on correspondence between the component piece and the number of strokes, (3) a regular shape portion data storing unit 2c, (4) an element portion pasting-use component piece data storing unit (hereinafter referred to as element piece data storing unit) 2d as component piece data storing means and an element portion pasting-use component piece data storing unit, and (5) a regular shape portion pasting-use component piece data storing unit (hereinafter referred to as regular shape piece data storing unit) 2e as component piece data storing means and a regular shape portion pasting-use component piece data storing unit.

Figure 2:
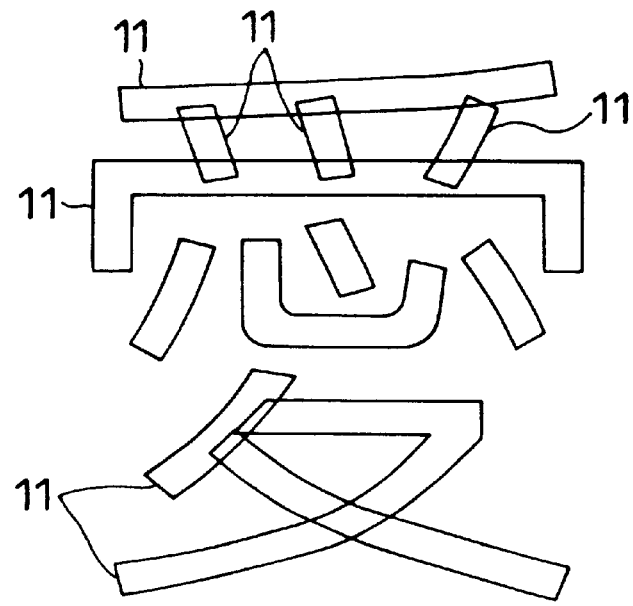
FIG. 2 is an explanatory view illustrating an example of a character of a basic font to be stored in a character data storing unit shown in FIG. 1.

The character data storing unit 2a stores character data of a basic font, for example, as illustrated in FIG. 2, so that a character of a new font is formed based on the character data. As shown in FIG. 4, the character data on each character are composed of, for example, a font code, a character code, information on the number of strokes, polygon information, pasting reference information, point information, and point number information.

Here, "polygon" and "paste" will be explained below.

For example, as illustrated in FIG. 2, the "polygon", that is, a polygon 11, is an outline of a picture line composed of a stroke and element portions, in outline character data expressed with the use of straight lines and Bezier lines. Element starting point flags and element end point flags at points constituting the polygons 11 have characteristics of alternately appearing clockwise.

Figure 3:
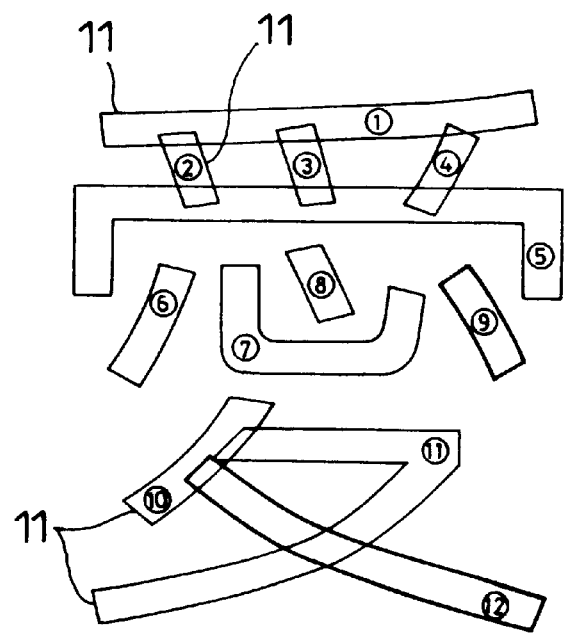
FIG. 3 is an explanatory view illustrating polygon numbers given to the polygons constituting the character illustrated in FIG. 2.

Furthermore, as illustrated in FIG. 3, the polygons 11 are given polygon numbers (1 through 12 in the figure) in accordance with the stroke order, and data on the polygons 11 are processed in the numerical order during font creation. Each character formed by the character forming apparatus of the present embodiment is composed of a single polygon 11, or a plurality of polygons 11.

"Paste" indicates that data on a component piece, for example, one among those illustrated in FIG. 5, is pasted to a target portion of original character data which is used during the character formation.

The font code of the character data represents a type of a font and the number of characters. The character code represents a character number (in accordance with the Japanese Industrial Standard) of each character of the font and the number of polygons constituting the character. The information on the number of strokes represents the number of strokes of the character. The polygon information represents information on each of the polygons constituting the character, that is, the polygon number of each polygon and the number of points constituting the polygon. The point information represents information on each of points constituting the polygon, that is, the point's number, coordinate, and attribute information (flag), or the like. The point number information shows an element number, input/output angles, and paste reference points for pasting a pasting-use component piece in the polygon. Note that the input/output angles represent reference angles for pasting the pasting-use component pieces.

The pasting reference information includes (1) information on polygons of a character before a pasting operation, to be used for checking angles and lengths of the pasting-use component pieces pasted to the polygons, and (2) reference position information showing reference angles and lengths for checking whether or not the pasting-use component pieces pasted to the polygons fit therein after the pasting operation.

The table storing unit 2b is for storing a reference table which shows correspondence among the number of strokes, the stroke number rank code, and the type of the pasting-use component pieces, as illustrated in FIG. 10. The reference table is referred to for determining which pasting-use component piece is to be used for character formation.

The regular shape portion data storing unit 2c is for storing information on regular shape portions, which are, in a polygon, portions other than element portions in a part where a pasting operation is applied.

The element piece data storing unit 2d and the regular shape piece data storing unit 2e are for storing data on pasting-use component pieces, for example, those shown in FIG. 5, which are used for changing shapes of characters of a basic font, that is, for carrying out component piece pasting operations. The pasting-use component pieces are basic pasting-use component pieces classified depending on the number of strokes. The basic pasting-use component pieces differ in shapes depending on the stroke number rank codes A through E, i.e., depending on the number of strokes. This is because by doing so, pieces suitable for the number of strokes of a character are selected so that the character has a well-balanced shape. Note that the numerals 1 through 5 lined in a horizontal direction represent the pasting-use component piece data types shown in FIGS. 9 and 10. Each pasting-use component piece is expressed with straight lines and Bezier lines, and the data thereof are composed of data of a single polygon or a plurality of polygons, point data, and pasting reference information.

The main memory 3 has an input buffer 3a, an output buffer 3b, and a memory unit 3c. The input buffer 3a is for temporarily storing data on the character of the basic font which is read from the sub memory 2. The output buffer 3b is for temporarily storing data on the pasting-use component pieces which are deformed. The memory unit 3c is for storing information regarding character formation or the like.

The CPU 4 is for controlling operations of the respective sections. The CPU 4 has (1) an element shape recognizing unit 4a as target portion detecting means for detecting target portions to which pasting operations are applied, character shape recognizing means, and component piece data selecting means, (2) a regular shape recognizing unit 4b as target portion detecting means, character shape recognizing means, and component piece data selecting means, (3) a pasting-use component piece deforming unit 4c as component piece deforming means, (4) pasting-deforming operation checking unit 4d as deforming operation checking means, (5) a deformation correcting unit 4e as component piece data correcting means, (6) a deformation end checking unit 4f, (7) a character data synthesizing unit 4g as character data synthesizing means, (8) a work memory 4h, and (9) a control unit 4i.

The element shape recognizing unit 4a and the regular shape recognizing unit 4b are for extracting element portions and regular shape portions to which the pasting operation is to be applied, from original character data. The pasting-use component piece deforming unit 4c is for deforming shapes of the pasting-use component pieces. The pasting-deforming operation checking unit 4d is for checking whether or not the pasting-use component piece fits the polygon after the synthesis. The deformation correcting unit 4e is for correcting the deformation with respect to the pasting-use component piece based on the result of checking by the pasting-deforming operation checking unit 4d. The character data synthesizing unit 4g is for synthesizing the polygon data and the pasting-use component piece data obtained through processing by the above-described sections so as to form the character in a new font.

The CPU 4 further includes a program memory not shown in the figures. The control unit 4i uses the work memory 4h, and controls character forming operations based on the data stored in the sub memory 2 and the main memory 3, by following control programs recorded in the program memory.

The bit map memory 5 is for developing character patterns formed by the CPU 4 into bit map data. The display device 6 is for displaying the characters based on the bit map data stored in the bit map memory 5. The output device 7 is for printing the characters based on the bit map data.

Figure 6:
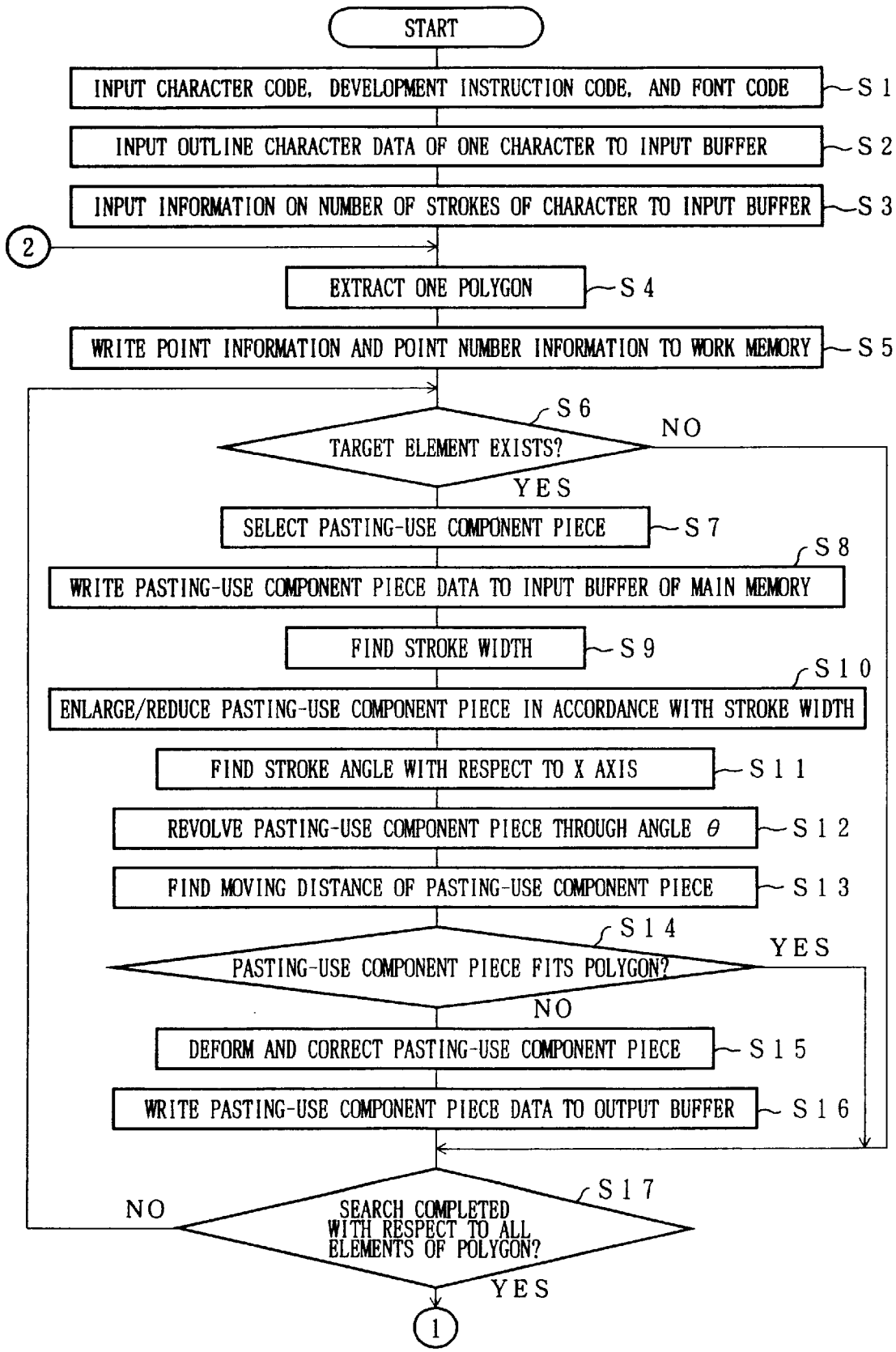
FIG. 6 is a flowchart illustrating an operation of the character forming apparatus shown in FIG. 1.

Operations of the character forming apparatus of the present embodiment having the above-described arrangement will be described below, while referring to the flowcharts in FIGS. 6 and 7. Here, by using the font of the outline character shown in FIG. 2 as a basic font and the pasting-use component pieces shown in FIG. 5, a character " " (JIS code: 3026) of a font (PEN) illustrated in FIG. 8 is formed.

For the character formation, a character code of a character to be formed, a development instruction code, and a name of a font to be created are inputted by the user of the character forming apparatus, by using the keyboard 1 (S1). The information is transferred to the input buffer 3a of the main memory 3 by the control unit 4i of the CPU 4, and is stored therein.

Figure 9:
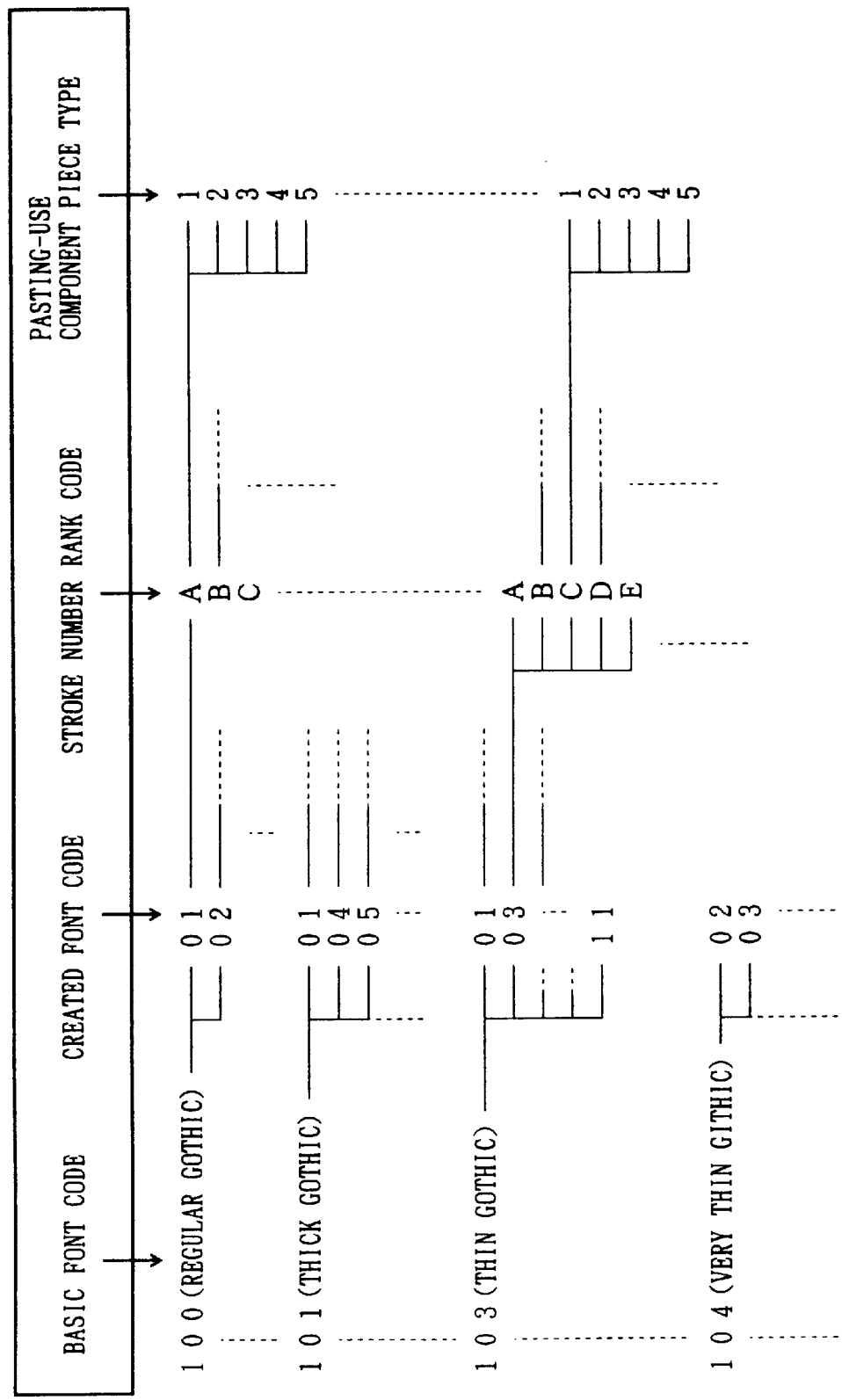
FIG. 9 is an explanatory view illustrating an example of a development instruction code inputted during character formation through the key board shown in FIG. 1.

The development instruction code is composed of four data, as illustrated in FIG. 9, namely, (1) basic font code indicating the basic font on which the character formation is carried out, (2) a created font code indicating a font to be created, (3) a stroke number rank code indicating the number of strokes of the character, which is used for determining which pasting-use component piece is used, and (4) a pasting-use component piece type to be used.

Figure 8:
FIG. 8 is an explanatory view illustrating an example of a character formed by the character forming apparatus illustrated in FIG. 1.

Since the Chinese character " " shown in FIG. 8 is used in this case, codes to be inputted are, for example, (1) the character code "3026" which is the character number of the aforementioned Chinese character, (2) the basic font code "103" (thin gothic), (3) the created font code "03" (PEN), (4) the stroke number rank code "B" (10–14), and (5) the pasting-use component piece type to be used, which is "1".

Subsequently, from the character data storing unit 2a of the sub memory 2, the control unit 4i reads the outline character data of the character which was designated at S1 with the character code, and is to be formed with the font designated with the font code of the development instruction code. The control unit 4i writes the data into the buffer 3a of the main memory 3 (S2). Here, the outline character data of the character code "3026" is read.

Then, the control unit 4i reads the information on the number of strokes of the character from the table storing unit 2b of the sub memory 2 and writes it into the input buffer 3a of the main memory 3 (S3). Here, regarding the character data, the information on the number of strokes "13" shown in FIG. 4 is read.

At the next stage, among the data on the polygons constituting the Chinese character written into the input buffer 3a, the control unit 4i fetches data on a polygon given the lowest polygon number from the character data storing unit 2a, and sends the data to the work memory 4h (S4). After the process described below is completed with respect to the polygon, data on a polygon given the second lowest polygon number are fetched, and this fetching operation and the following process is sequentially carried out with respect to each polygon in the numerical order of the polygon number.

The control unit 4i fetches the point information and the point number information shown in FIG. 4 which constitute the polygon data, and sends them to the work memory 4h of the CPU 4 (S5), so as to detect which portion of the character should be processed.

Then, the element shape recognizing unit 4a searches for a point at which an element starting point flag as point attribute information is in the ON state, among the point information inputted at S4 regarding the polygon (S6). Note that the number of the points at which element starting point flags are in the ON state are referred to as element information number. In the case where such a point does not exist, the flow proceeds to S17.

Figure 12:
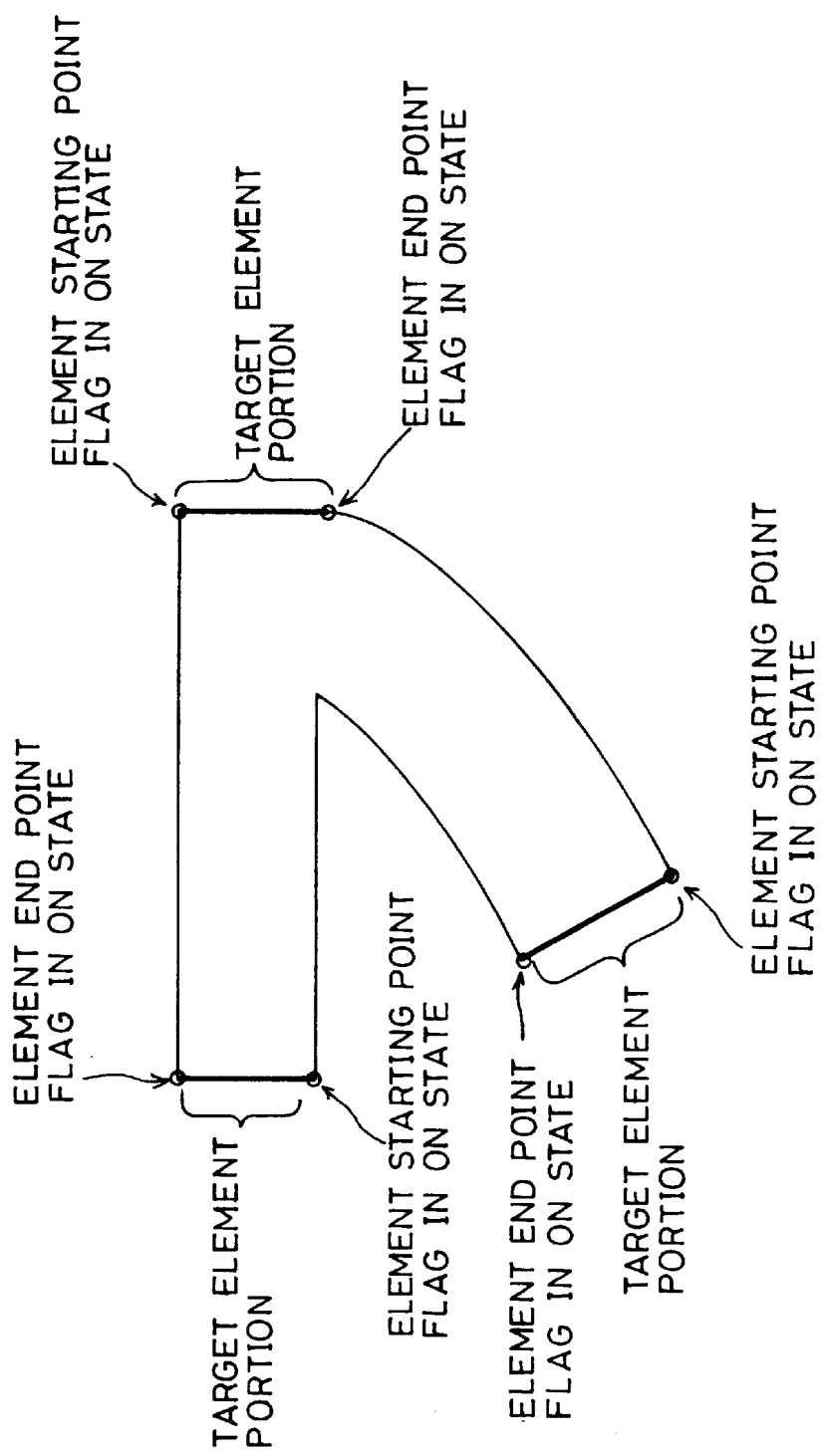
FIG. 12 is an explanatory view illustrating target element portions of one polygon of the character shown in FIG. 2.

Here, as illustrated in FIG. 12, in the case where exists the point (hereinafter referred to as first point) at which the element starting point flag is in the ON state, a portion ranging clockwise from the first point to a point (hereinafter referred to as second point) at which an element end point flag is in the ON state and which is closest to the first point is regarded as an element portion (hereinafter referred to as target element portion) to be processed. Note that the ON state of the flags is indicated by the point attribute information on the point information regarding the character data.

The element shape recognizing unit 4a determines which pasting-use component piece is to be used (S7), based on the point number information obtained at S5 which is indicated by the starting point flag and the information on the number of strokes obtained at S3 which is shown in FIG. 10. Here, for example, the element number (2101) as the point number information and the information on the number of strokes (C) shown in FIG. 11 are used.

Subsequently, the control unit 4i reads data on the pasting-use component piece determined at S7 from the element piece data storing unit 2d, and sends it to the input buffer 3a of the main memory 3 (S8).

Then, a stroke width of each polygon 11 is found (S9).

Figure 13:
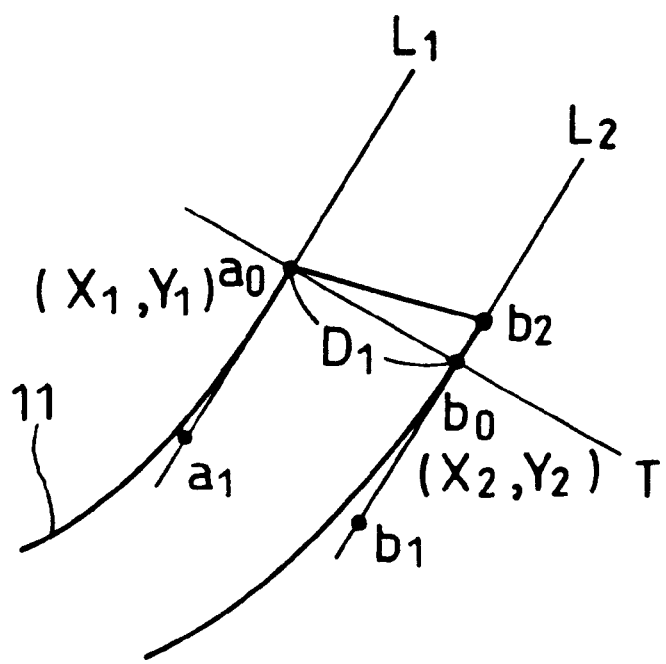
FIG. 13 is an explanatory view illustrating an operation by the element shape recognizing unit shown in FIG. 1 for detecting a stroke width of the polygon.

Here, as illustrated in FIG. 13, the element shape recognizing unit 4a obtains (1) a straight line $L_1$ which connects a point $a_0$ at which the element starting point flag is in the ON state and a point $a_1$ which is positioned closest to the point $a_0$ in an anti-clockwise direction, and (2) a straight line $L_2$ which connects a point $b_2$ at which the element end point flag is in the ON state and a point $b_1$ which is positioned closest to the point $b_2$ in a clockwise direction. The element shape recognizing unit 4a finds a crossing point $b_0$ of the straight line $L_2$ and a line T which passes the point $a_0$ and is vertical to the straight line $L_2$, and finds a distance $D_1$ between the points $a_0$ and $b_0$, by using coordinate values of the points $a_0$ and $b_0$ ($a_0$=($X_1$, $Y_1$), $b_0$=($X_2$, $Y_2$)), and the following formula:

$$a_0 b_0 = \{(X_2-X_1)^2 + (Y_2-Y_1)^2\}^{1/2}$$

The distance $D_1$ is the stroke width of the polygon 11.

Figure 14:
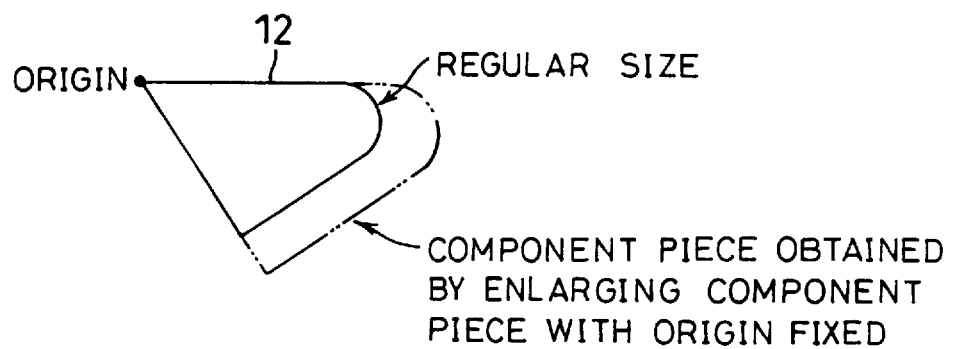
FIG. 14 is an explanatory view illustrating an operation by the pasting-use component piece deforming unit shown in FIG. 1 for enlarging/reducing a pasting-use component piece.

Then, the pasting-use component piece deforming unit 4c widens or narrows the stroke width of the pasting-use component piece in accordance with the stroke width $D_1$, as illustrated in FIG. 14 (S10)

Here, the magnifying ratio of the pasting-use component piece in accordance with to the stroke width is obtained by ($D_1 \div D \times E$), where D represents a reference stroke width, E represents a size of the pasting-use component piece corresponding to D, and $D_1$ represents the stroke width found at S9 of the polygon to which the operation is applied. The pasting-use component piece deforming unit 4c enlarges or reduces the pasting-use component piece whose data were read at S8, at the magnifying ratio thus obtained, using the origin as the center of the enlargement or reduction.

Subsequently, the element shape recognizing unit 4a finds a stroke angle of the polygon 11 (S11).

Figure 15:
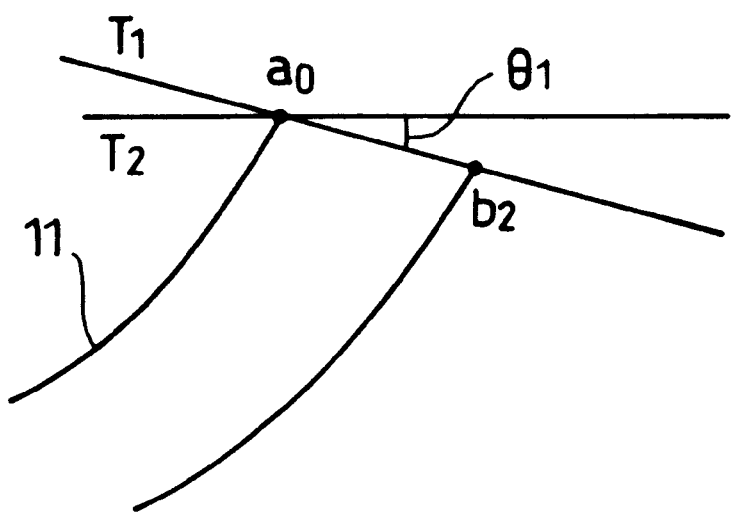
FIG. 15 is an explanatory view illustrating an operation by the element shape recognizing unit shown in FIG. 1 for detecting a stroke angle of the polygon.

As illustrated in FIG. 15, the element shape recognizing unit 4a finds an angle $\theta_1$ between intersecting straight lines $T_1$ and $T_2$, the straight line $T_1$ connecting the ends $a_0$ and $b_0$ of an element of the polygon 11, the straight line $T_2$ being parallel to the X axis, by using a function for obtaining an angle between the two intersecting straight lines. The angle $\theta_1$ is the stroke angle.

In addition to, as described above, basic stroke angles $\theta$ which respectively correspond to the element numbers, information shown by the starting point flag includes data showing whether or not the pasting-use component piece needs to revolve. In the case where data indicating the necessity of revolution exist, the pasting-use component piece is revolved at S12. On the other hand, in the case where data indicating that revolution is unnecessary exist, the flow proceeds from S11 directly to S13.

Figure 16:
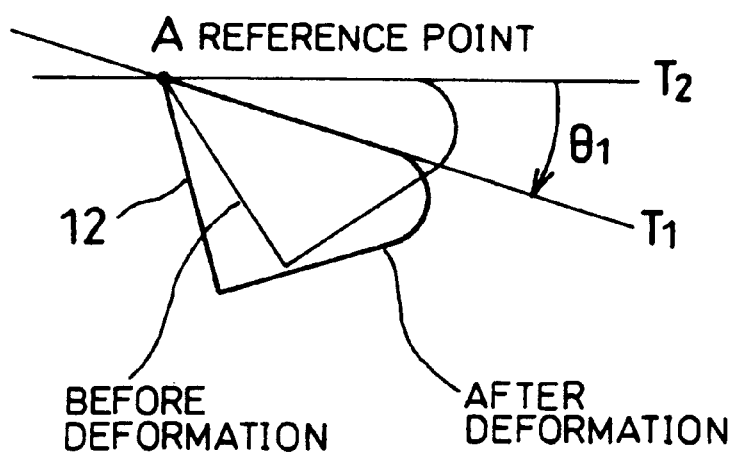
FIG. 16 is an explanatory view illustrating a revolving operation by the pasting-use component piece deforming unit shown in FIG. 1 for revolving the pasting-use component piece for the element portion.
Figure 17:
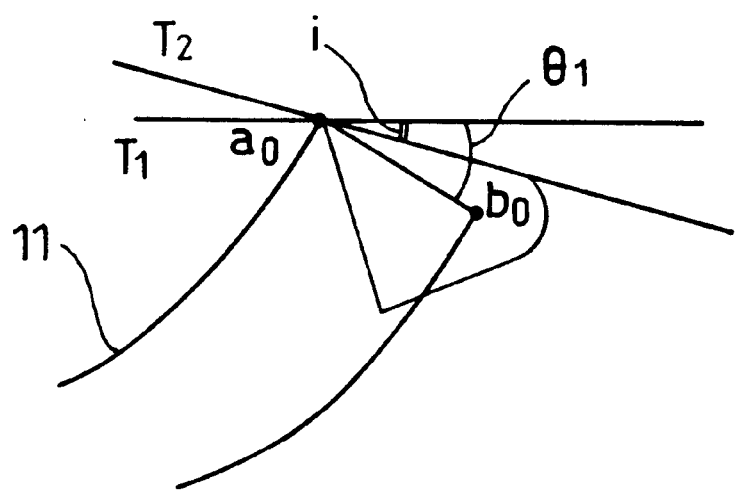
FIG. 17 is an explanatory view illustrating an upper limit on revolution in the revolving operation shown in FIG. 16.

In the case where the revolution is necessary, the pasting-use component piece deforming unit 4c revolves the pasting-use component piece thus enlarged at S10 through an angle $\theta_1$, using a reference point A as the center of revolution, as illustrated in FIG. 16 (S12). Note that in the case where the angle $\theta_1$ is too great, a problem of quality occurs. Therefore, an upper limit i is set for the angle $\theta_1$, and in the case where i<$\theta_1$, the angle $\theta_1$ is fixed to the upper limit i, as illustrated in FIG. 17.

Figure 18:
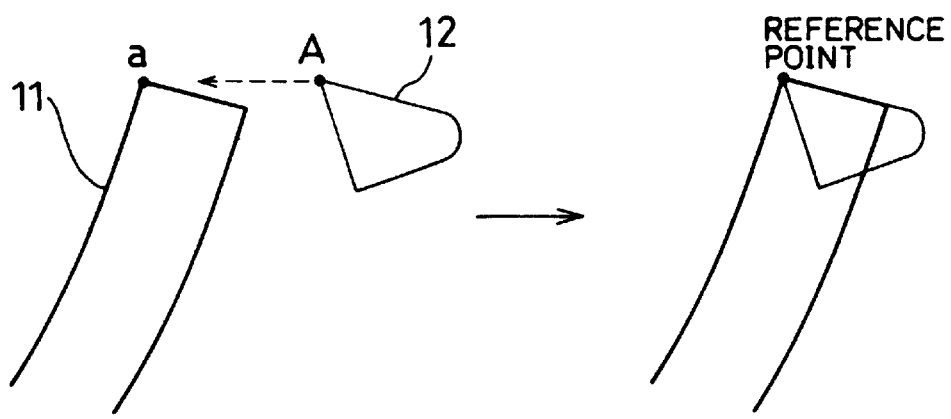
FIG. 18 is an explanatory view illustrating an operation for pasting the pasting-use component piece shown in FIG. 16 to the element portion of the polygon.

At the next stage, the control unit 4i finds a distance which the pasting-use component piece 12 moves by so that the reference point A of the pasting-use component piece 12 falls on a reference point a of the polygon 11, as illustrated in FIG. 18 (S13).

Subsequently, the pasting-deforming operation checking unit 4d checks whether or not the pasting-use component piece 12 which has gone through an operation at S13 fits the polygon 11 when being provided at a predetermined position. This check is carried out based on the coordinates which are referred to in determining whether the portion fits or not, as well as based on the pasting reference information indicating reference points used in determining whether or not correction or moving is necessary (S14). In the case where it is judged that the pasting-use component piece 12 fits the polygon 11, the flow proceeds to S17.

Figure 19:
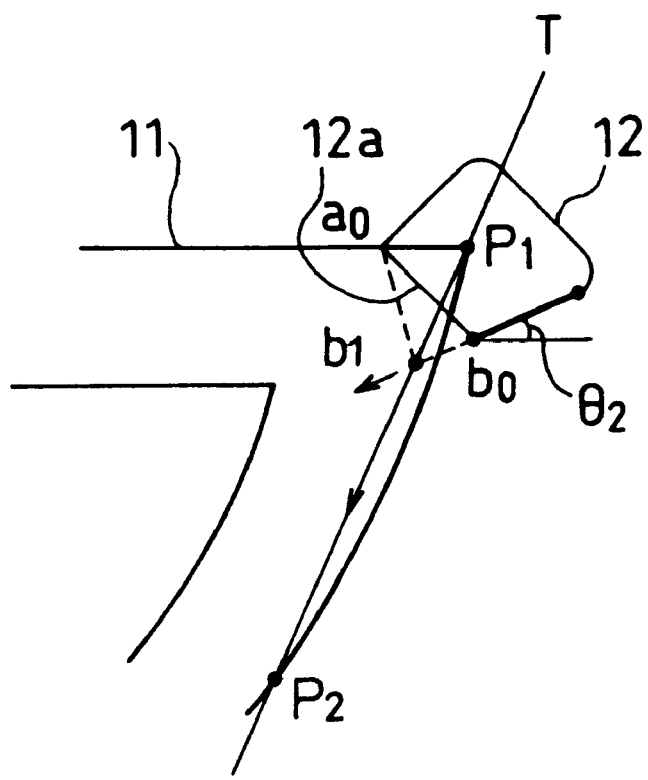
FIG. 19 is an explanatory view illustrating a deformation correcting operation by the deformation correcting unit shown in FIG. 1 for correcting the deformation of the pasting-use component piece.

On the other hand, in the case where it is judged at S14 that the pasting-use component piece 12 does not fit the polygon 11, the deformation correcting unit 4e corrects it by deforming the pasting-use component piece 12 so that it fits the polygon 11 (S15). To be more specific, as illustrated in FIG. 19, the pasting-use component piece 12 is deformed so that an edge 12a of the pasting-use component piece 12 falls within the polygon 11. In this case, first, a straight line T is drawn, which passes a point $P_1$ at which the element starting point flag is in the ON state and a neighboring point $P_2$ indicating the outline. Then, the pasting-use component piece 12 is moved along an output angle $\theta_2$ in the point number information stored in the character data storing unit 2a till a point $b_0$ falls on a point $b_1$. By doing so, the pasting-use component piece 12 is deformed and corrected along the above output angle $\theta_2$, and the point $b_0$ which did not fall within the polygon 11 is caused to move to the position of the point $b_1$ in the polygon 11.

Subsequently, the control unit 4i writes data on the pasting-use component piece 12 thus deformed at S15, to the output buffer 3b of the main memory 3 (S16).

Then, the deformation end checking unit 4f checks whether or not the search by the element shape recognizing unit 4a at S6 is finished with respect to all the point information on the points constituting the polygon 11 which are fetched at S4 (S17). The flow returns to S6 in the case where it is judged as a result of the check that the search is not completed, and the steps after S6 are repeated.

Note that the judgment on whether or not the search is completed is based on whether or not the element information number detected at S6 for recognizing the target element portions coincides with the element information number in the point information on the points constituting the polygon. Therefore, in the case where both the numbers do not coincide with each other, the operation with respect to the polygon is regarded as uncompleted, and the steps after S6 are repeated. On the other hand, in the case where the numbers coincide, the pasting of the pasting-use component pieces to the element portions of the polygon is finished.

Figure 7:
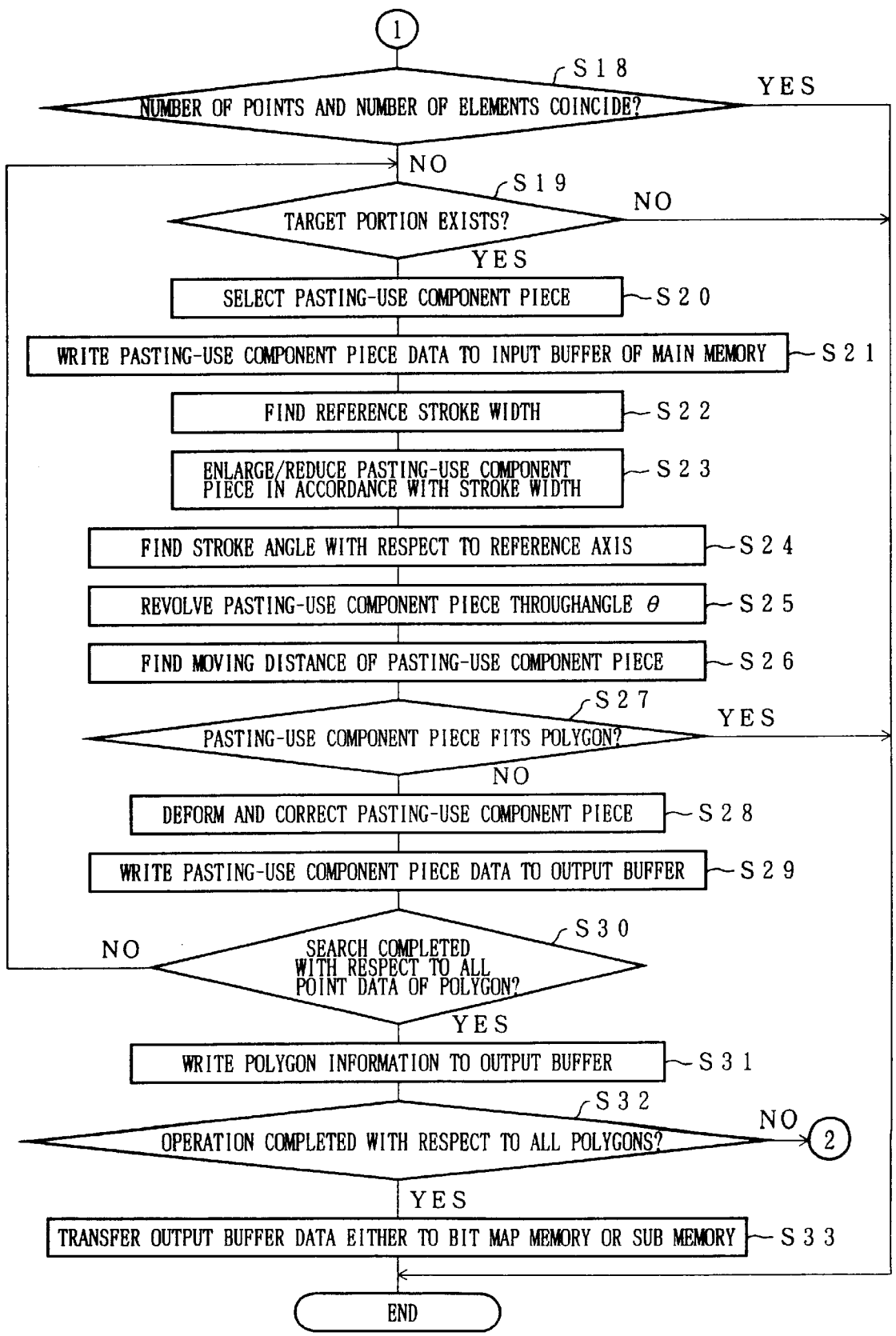
FIG. 7 is a flowchart illustrating another operation of the character forming apparatus which follows the operation shown in FIG. 6.

Furthermore, the control unit 4i checks at S18, as illustrated in FIG. 7, whether or not the number of the points constituting the polygon and the number of the element information number coincide with each other. In the case where the numbers coincide, the operation is ended.

On the other hand, in the case where it is found as a result that the numbers do not coincide, the regular shape recognizing unit 4b checks whether or not the information stored in the regular shape portion data storing unit 2c is included in the points fetched at S4 as points constituting the polygon (S19). In the case where it is found as a result that no such information is included therein, the operation is ended.

On the other hand, in the case where the above information is included therein, the control unit 4i determines which pasting-use component piece is to be used (S20), based on the above information and the information on the number of strokes obtained at S3 which is shown in FIG. 10. Here, the number of strokes is "13", and the stroke number rank code is "B".

At the next stage, the control unit 4i reads data on the pasting-use component piece determined at S20 from the regular shape piece data storing unit 2e, and sends it to the input buffer 3a of the main memory 3 (S21).

Then, the regular shape recognizing unit 4b finds a stroke width of each polygon 11 (S22).

Figure 20:
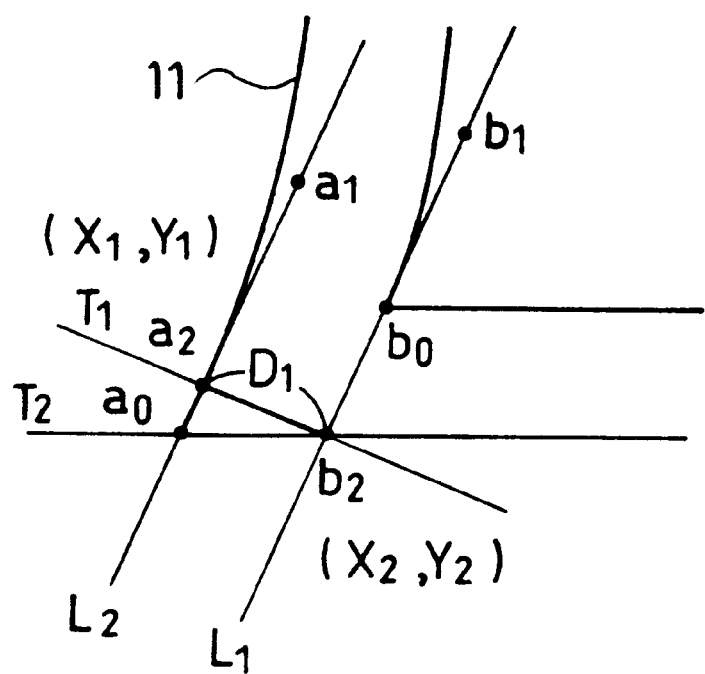
FIG. 20 is an explanatory view illustrating an operation by the regular shape recognizing unit shown in FIG. 1 for detecting a stroke width of a polygon to be processed.

Here, as illustrated in FIG. 20, the regular shape recognizing unit 4b obtains (1) a straight line $L_1$ which connects a point $b_0$ and a point $b_1$ which is positioned closest to the point $b_0$ in an anti-clockwise direction, and (2) a straight line $L_2$ which connects a point $a_0$ and a point $a_1$ which is positioned closest to the point $a_0$ in a clockwise direction. Furthermore, in the case where the portion extracted by the regular shape recognizing unit 4b, the regular shape recognizing unit 4b finds a crossing point $b_2$ of the straight line $L_1$ and a stroke, that is, a line $T_2$. And also it finds a crossing point $a_2$ of the straight line $L_2$ and a line $T_2$ which passes the crossing point $b_2$ and is vertical to the straight line $L_2$. Then, in the same manner as at S9, the regular shape recognizing unit 4b finds a distance $D_1$ between the points $a_2$ and $b_2$, by using coordinate values of the points $a_2$ and $b_2$ ($a_2=(X_1, Y_1)$, $b_2=(X_2, Y_2)$). The distance $D_1$ is the stroke width of the polygon 11.

Then, in the same manner as at S10, the pasting-use component piece deforming unit 4c widens or narrows the stroke width of the pasting-use component piece in accordance with the stroke width $D_1$ (S23).

Subsequently, the regular shape recognizing unit 4b finds a stroke angle of the polygon 11 (S24).

Figure 21:
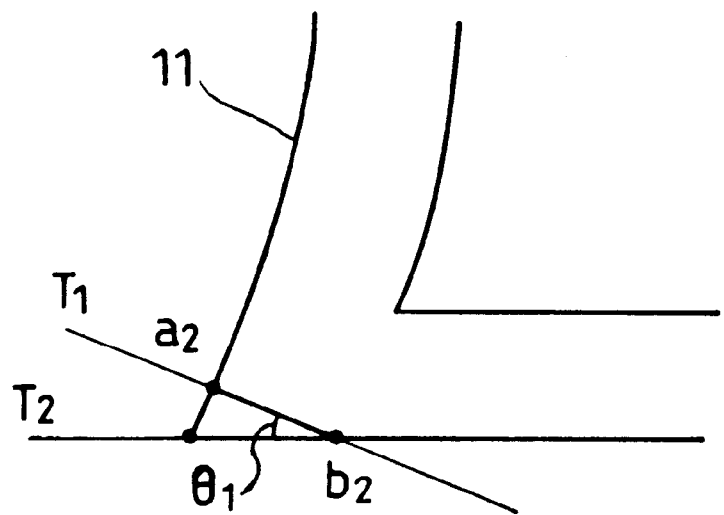
FIG. 21 is an explanatory view illustrating an operation by the regular shape recognizing unit shown in FIG. 1 for detecting a stroke angle of the polygon.

As illustrated in FIG. 21, the regular shape recognizing unit 4b finds an angle $\theta_1$ between the intersecting straight lines $T_1$ and $T_2$. The angle $\theta_1$ is the stroke angle. So as to conduct such computation, the regular shape recognizing unit 4b is equipped with calculating functions for calculating reference strokes and points which correspond to respective regular shapes.

Figure 22:
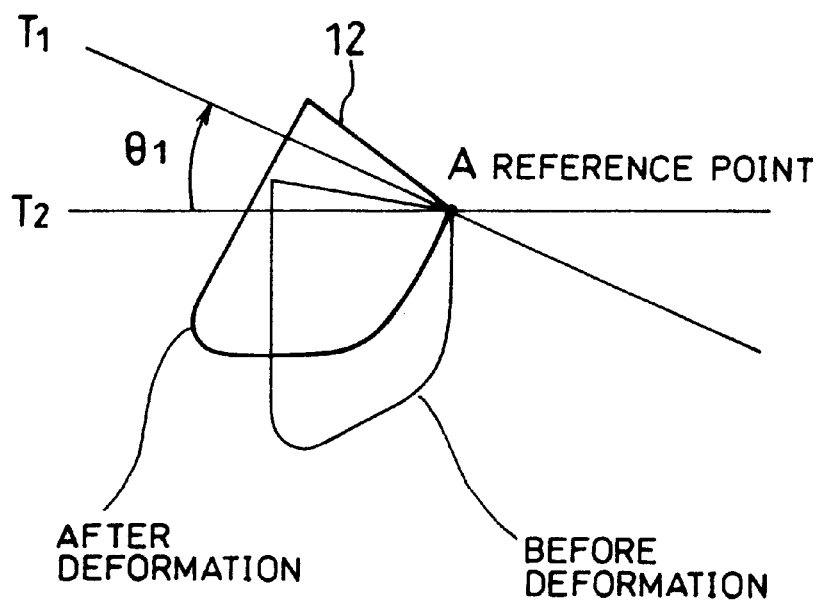
FIG. 22 is an explanatory view illustrating a revolving operation by the pasting-use component piece deforming unit shown in FIG. 1 for revolving the pasting-use component piece for the regular shape portion.

Then, the pasting-use component piece deforming unit 4c revolves the pasting-use component piece thus enlarged or reduced at S22 through an angle $\theta_1$, using a reference point A as the center of revolution, as illustrated in FIG. 22 (S25).

Figure 23:
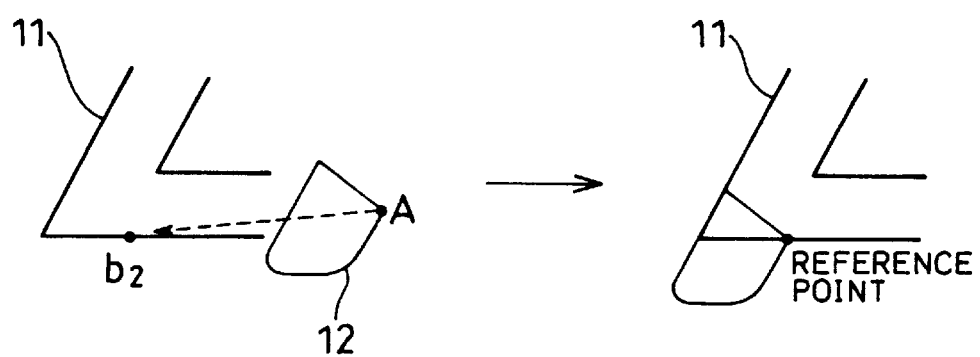
FIG. 23 is an explanatory view illustrating an operation for pasting the pasting-use component piece shown in FIG. 22 to the regular shape portion of the polygon.
Figure 24B:
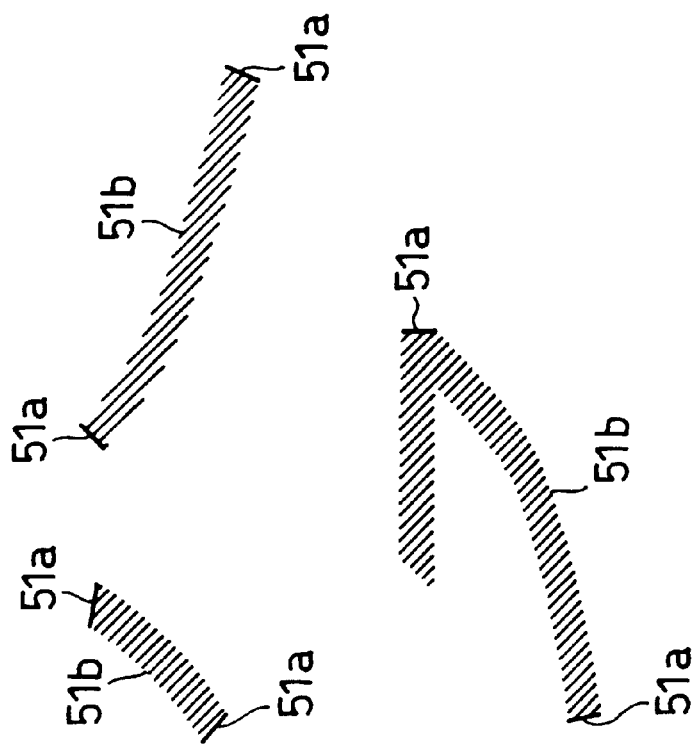
FIG. 24(b) is an explanatory view illustrating element portions and strokes of some polygons constituting the character shown in FIG. 24(a).
Figure 24A:
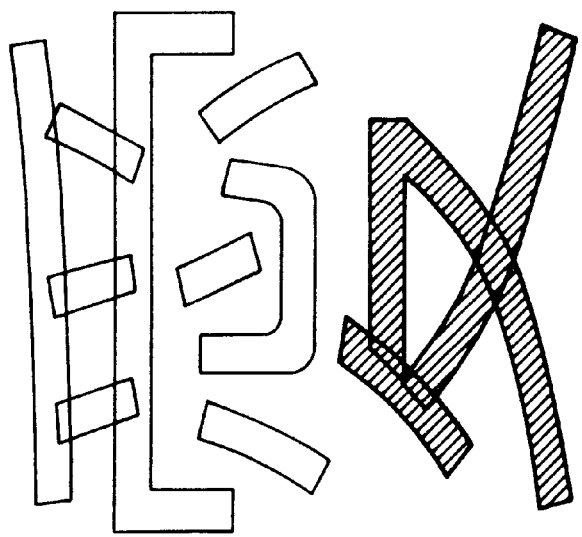
FIG. 24(a) is an explanatory view illustrating an example of a character.

At the next stage, the control unit 4i finds a distance which the pasting-use component piece 12 moves by so that the reference point A of the pasting-use component piece 12 falls on the reference point a of the polygon 11, as illustrated in FIG. 23 (S26).

Subsequently, the pasting-deforming operation checking unit 4d checks whether or not the pasting-use component piece 12 which has gone through an operation at S26 fits the polygon 11, in the same manner as at S14 (S27). In the case where it is judged as a result that the pasting-use component piece 12 fits the polygon 11, the flow proceeds to S17.

On the other hand, in the case where it is judged at S27 that the pasting-use component piece 12 does not well fit the polygon 11, the deformation correcting unit 4e corrects it by deforming the pasting-use component piece 12 so that it fits the polygon 11 (S28).

In this case, as in the same manner as that for the process explained referring to FIG. 19, the pasting-use component piece 12 is moved along an output angle in the point information stored in the character data storing unit 2a.

Subsequently, the control unit 4i writes data on the pasting-use component piece 12 thus deformed at S28, to the output buffer 3b of the main memory 3 (S29).

Then, the deformation end checking unit 4f checks whether or not the aforementioned deformation process is finished with respect to all the point information which was judged to have not yet been processed at S19 (S30). The flow returns to S19 in the case where it is judged as a result of the check that the deformation process is not completed, and the steps after S19 are repeated.

Note that the judgment on whether or not the search is completed is based on whether or not a sum of (1) the number of the points constituting the regular shape portion which were detected at S19 for recognizing the target regular shape portion and (2) the number of the points constituting the element portion which were detected at S6 for recognizing the target element portion coincides with the number of the points constituting the polygon. Therefore, in the case where they coincide with each other, the operation with respect to the polygon is regarded as uncompleted, and the steps after S19 are repeated. On the other hand, in the case where the numbers coincide, the pasting of the pasting-use component pieces to the polygon is finished.

At the next stage, the character data synthesizing unit 4g sends the polygon information which was read out at S4 and is stored in the work memory 4h to the output buffer 3b of the main memory 3 so that the polygon information is stored therein (S31).

The character data synthesizing unit 4g synthesizes (1) the data on the pasting-use component pieces and (2) the data on the target element portions and target regular shape portions of the polygon 11, so that the pasting-use component pieces overlap the target element portions and target regular shape portions. To be more specific, through the operations at S16 and S28, the pasting-use component pieces are positioned so as to overlap the target element portions and target regular shape portions of the polygon 11. As a result, the outline character data wherein the pasting-use component pieces are already pasted are stored in the output buffer 3b.

Subsequently, the control unit 4i checks whether or not all the polygons in the outline character data read out at S2 have gone through the above-described process, based on data recorded in the memory unit 3c (S32). In the case where it is judged that the process is uncompleted, the flow returns to S4 so that the steps after S4 are repeated.

On the other hand, in the case where it is judged that the process is completed, the control unit 4i sends the outline character data of one character stored in the output buffer 3b of the main memory 3 to the bit map memory 5 or the sub memory 2 (S33). With this, the character forming operation with respect to one character is completed.

The outline character data sent to the bit map memory 5 are developed into bit map data and are either displayed by the display device 6 or printed by the output device 7.

In the above description, the Chinese character in the PEN-type font is taken as an example, and the pasting-use component pieces are for the element portions such as stops of strokes and shoulders. But such pasting-use component pieces can be prepared for other parts, as well as for characteristic portions of characters of other fonts.

The character forming apparatus of the present embodiment can be of course applied to a laser printer, other types of printers, and also to an apparatus which is required to have a function of converting outline font data of characters and marks to outlines.

Though in this embodiment the outline character which is expressed by straight lines and Bezier lines is taken as an example of a character to be formed, the character forming apparatus of the present embodiment is of course applicable to other types of characters.

As has been so far described, the character forming apparatus of the present invention is preferably characterized in including (1) character shape recognizing means for recognizing shapes of the target portions of the character of the basic font designated by the input means, and (2) component piece deforming means for changing component piece data selected by the component piece data selecting means so that the component pieces are deformed so as to fit the target portions.

With the above described arrangement, the data on the component pieces pasted to the character of the basic font for the character formation are deformed by the component piece deforming means so that the component pieces fit the shapes of the target portions. Therefore, the character thus formed has better quality. Besides, since the component pieces are deformed by the component piece deforming means as the need arises, it is possible to decrease the number of the component pieces stored in the component piece data storing means.

Furthermore, the character forming apparatus of the present invention is preferably characterized in including correspondence data storing means for storing data on correspondence between the number of strokes in one character and the component piece stored in the component piece data storing means, the component pieces stored in the component piece data storing means differing in shapes depending on the number of strokes in the character, wherein the component piece data selecting means selects component piece data stored by the component piece data storing means, based on information recorded by the correspondence data storing means and the number of strokes of the character to be formed.

According to the above arrangement, component piece data are selected by the component piece data selecting means among those stored in the component piece data storing means, in accordance with the information recorded by the correspondence data storing means and the number of strokes of the character to be formed. As a result, data on component pieces suitable for the character to be formed are used for forming the character. By doing so, even in the case where a character having many strokes is formed, the character has good quality. Particularly, an effect that the smearing of the ornamental parts in such a character having many strokes is avoidable.

The character forming apparatus of the present invention is preferably characterized in including (1) deforming operation checking means for checking whether or not the deforming operation by the component piece deforming means is appropriate, and (2) component piece data correcting means for, in the case where it is judged by the deforming operation checking means that the deforming operation is inappropriate, correcting the component piece data judged to be inappropriate.

According to the above-described arrangement, in the case where inappropriateness of the deformation of the component pieces by the component piece data deforming means is detected, the inappropriate component piece data are corrected by the component piece data correcting means. By doing so, a character having better quality is formed.

The character forming apparatus of the present invention is preferably characterized in that the component piece data storing means further includes (1) an element portion pasting-use component piece data storing unit for storing data on component pieces to be pasted to element portions of the character of the basic font, and (2) a regular shape portion pasting-use component piece data storing unit for storing data on component pieces to be pasted to regular shape portions of the character of the basic font, the regular shape portions being the portions other than the element portions.

With the above arrangement, it is possible to paste optimal component pieces to the element portions and the other portions of the character to be formed. As a result, it is possible to form a character having further better quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A character forming apparatus comprising:

character data storing means for storing character data showing each shape of characters of a basic font for the use in character formation, each character having target portions to which component pieces are to be pasted;

component piece data storing means for storing data on a plurality of component pieces to be pasted to the target portions of the character of the basic font;

input means for designating a character of the basic font and another font to be used for processing the character;

target portion detecting means for detecting the target portions of the character data of the basic font designated by said input means;

component piece data selecting means for selecting component piece data to be used among those stored by said component piece data storing means, based on information supplied from said input means; and character data synthesizing means for synthesizing the character data so that the component pieces selected by said component piece data selecting means are pasted to the target portions detected by said target portion detecting means, wherein said target portion includes an element and a regular shape portion of said character data, and positions which are designated by flags constituting said target portion are always fixed.

2. A character forming apparatus as set forth in claim 1, further comprising:

character shape recognizing means for recognizing shapes of the target portions of the character of the basic font designated by said input means; and component piece deforming means for changing component piece data selected by said component piece data selecting means so that the component pieces are deformed so as to fit the target portions.

3. The character forming apparatus as set forth in claim 2, wherein said component piece deforming means enlarges or reduces the component pieces at a predetermined magnifying ratio.

4. The character forming apparatus as set forth in claim 2, wherein:

the character data include revolution instructing data for instructing revolution of the component pieces selected by said component piece data selecting means so that the component pieces fit the target portions; and said component piece deforming means revolves the component pieces in accordance with the revolution instructing data.

5. The character forming apparatus as set forth in claim 4, wherein, in the case where the revolution instructing data indicate revolution of the component pieces through an angle greater than a predetermined angle of revolution, said component piece deforming means revolves the component pieces through the predetermined angle.

6. A character forming apparatus as set forth in claim 1, further comprising correspondence data storing means for storing data on correspondence between the number of strokes in one character and the component piece stored in said component piece data storing means, the component pieces stored in said component piece data storing means differing in shapes depending on the number of strokes in the character, wherein said component piece data selecting means selects component piece data stored by said component piece data storing means, based on information recorded by said correspondence data storing means and the number of strokes of the character to be formed.

7. A character forming apparatus as set forth in claim 1, further comprising:

deforming operation checking means for checking whether or not the deforming operation by said component piece deforming means is appropriate; and component piece data correcting means for, in the case where it is judged by said deforming operation checking means that the deforming operation is inappropriate, correcting the component piece data judged to be inappropriate.

8. The character forming apparatus as set forth in claim 7, wherein said component piece data correcting means parallel moves the component pieces judged to be inappropriate, so that the inappropriateness is eliminated.

9. The character forming apparatus as set forth in claim 1, wherein said component piece data storing means includes:

an element portion pasting-use component piece data storing unit for storing data on component pieces to be pasted to element portions of the character of the basic font; and a regular shape portion pasting-use component piece data storing unit for storing data on component pieces to be pasted to regular shape portions of the character of the basic font, the regular shape portions being the portions other than the element portions.

10. The character forming apparatus as set forth in claim 9, wherein said component piece data selecting means selects component piece data to be used, among those stored by said element portion pasting-use component piece data storing unit, based on information supplied from said input means.

11. The character forming apparatus as set forth in claim 9, wherein said component piece data selecting means selects component piece data to be used, among those stored by said regular shape portion pasting-use component piece data storing unit, based on information supplied from said input means.

12. A character forming apparatus as set forth in claim 1, further comprising a control unit for conducting control for the character formation, wherein:

said target portion detecting means searches for first points among the points constituting the character of the basic font, each first point having a starting point flag in an ON state; and said control unit designates a portion ranging from the first point to a second point as a target portion, the second point having an end point flag in an ON state and is positioned closest to the first point in a clockwise direction along an outline of the character.

13. The character forming apparatus as set forth in claim 1, wherein said target portion detecting means includes element detecting means for detecting said element, regular shape portion detecting means for judging whether or not a point having information about said regular shape portion exists among points constituting a polygon corresponding to a stroke of said character, and based on a result of the judgment, detects said regular shape portion.

14. The character forming apparatus as set forth in claim 13, wherein said character data synthesizing means applies component piece data selected by said component piece data selecting means, to said element detected by said element detecting means and said regular shape portion detected by said regular shape portion detecting means, respectively.

\* \* \* \* \*